(12) United States Patent
Gruner-Nielsen

(10) Patent No.: US 9,360,628 B2
(45) Date of Patent: Jun. 7, 2016

(54) FIBER STRETCHER MODULE FOR USE IN THE 1550 NM WAVELENGTH RANGE

(71) Applicant: OFS Fitel, LLC, Norcross, GA (US)

(72) Inventor: Lars Gruner-Nielsen, Copenhagen (DK)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 14/627,390

(22) Filed: Feb. 20, 2015

(65) Prior Publication Data

US 2015/0177462 A1 Jun. 25, 2015

Related U.S. Application Data

(63) Continuation of application No. 14/126,058, filed as application No. PCT/US2011/067634 on Dec. 28, 2011, now Pat. No. 8,995,050.

(60) Provisional application No. 61/503,044, filed on Jun. 30, 2011.

(51) Int. Cl.
*H01S 3/00* (2006.01)
*G02B 6/293* (2006.01)
*H04B 10/2513* (2013.01)
*G02B 6/036* (2006.01)
*H01S 3/067* (2006.01)

(52) U.S. Cl.
CPC ...... *G02B 6/29377* (2013.01); *H04B 10/25133* (2013.01); *G02B 6/03644* (2013.01); *H01S 3/0057* (2013.01); *H01S 3/06725* (2013.01); *H01S 3/06766* (2013.01)

(58) Field of Classification Search
CPC .............. H04B 10/25133; H01S 3/06725; H01S 3/0057; H01S 3/06766
USPC .................................................. 359/337.5
See application file for complete search history.

(56) References Cited

U.S. PATENT DOCUMENTS

| | | | | |
|---|---|---|---|---|
| 6,643,438 B1* | 11/2003 | Sillard | ............... | G02B 6/02009 385/123 |
| 7,076,140 B2* | 7/2006 | Yamamoto | ......... | G02B 6/02261 385/123 |
| 7,164,834 B2* | 1/2007 | Yamamoto | ......... | G02B 6/02261 385/127 |
| 8,995,050 B2* | 3/2015 | Gruner-Nielsen | . | G02B 6/29377 359/337.5 |

* cited by examiner

*Primary Examiner* — Mark Hellner
(74) *Attorney, Agent, or Firm* — Mandelbaum Salsburg

(57) ABSTRACT

Embodiments of the present invention are generally related to embodiments of the present invention relate to a fiber stretchers module for use in the 1550 nm wavelength range. In one embodiment of the present invention, a fiber stretcher module for use in the 1550 nm wavelength range comprises a fiber having a relative dispersion slope, RDS, and a relative dispersion curvature, RDC, wherein a ratio of said slope to said curvature is between about 30 nm and about 0 nm, having a dispersion value of less than about −10 ps/(nm·km) at about 1550 nm, and a RDS is equal to or greater than 0.

6 Claims, 12 Drawing Sheets

FIBER STRETCHER MODULE FOR USE IN THE 1550 NM WAVELENGTH RANGE

CROSS-REFERENCE TO RELATED APPLICATION

The present application is a continuation of co-pending patent application Ser. No. 14/126,058, filed on Dec. 13, 2013, entitled "FIBER STRETCHER MODULE FOR USE IN THE 1550 NM WAVELENGTH RANGE", which is owned by the assignee of the present application, and which is incorporated herein by reference in its entirety. The patent application Ser. No. 14/126,058 claims the priority benefit of Provisional Patent Application Ser. No. 61/503,044, filed Jun. 30, 2011, which is owned by the assignee of the present application, and which application is incorporated herein by reference.

BACKGROUND

1. Field of the Invention

Embodiments of the present invention are generally related to embodiments of the present invention relate to fiber stretcher modules for use in the 1550 nm wavelength range. More specifically, embodiments of the present invention relate to a fiber stretcher module for dispersion management in short pulse laser systems.

2. Description of the Related Art

A fiber stretcher module offers a solution for known femtosecond fiber based chirped pulse amplification systems that typically use bulk optics or a chirped fiber Bragg grating to stretch the pulses. A chirped fiber Bragg grating generally yields large group delay ripples as well as significant amplitude ripples which are highly undesirable. As such, fiber-based stretchers are preferable over stretchers made of bulk optics due to smaller size, better stability, longer lifetime, lower cost and improved characteristics over the drawbacks described above.

A difficulty with using a fiber stretcher is that it must match a particular compressor grating (i.e., it must have an equal quantitative dispersion with an opposite sign—that is, positive/negative). Generally, the compressor grating has high numerical values for both third order dispersion $\beta_3$ and fourth order dispersion $\beta_4$. For example, a 1200 lines/mm compressor grating working at an incidence angle of 64.5° with a second order dispersion of $\beta_2 = -57.4$ ps$^2$ at 1550 nm should have the below dispersion values:

$\beta_2 = -57.4$ ps$^2$; $\beta_3 = 3.17$ ps$^3$; and $\beta_4 = -0.291$ ps$^4$ At 1550 nm, these values correspond to:

D=45 ps/nm; RDS=0.0420 nm$^{-1}$; and RDC=0.00295 nm$^{-2}$

Where D is the dispersion, RDS is the relative dispersion slope, and RDC is the relative dispersion curvature of the grating.

However, using a known stretcher module made of a combination of an existing Dispersion Compensation Fiber (DCF) and Super Large Effective Area (SLA) fiber, i.e., using around 0.90 km of Ultra-High Slope (UHS) DCF and 3.6 km of SLA, a stretcher module with the below dispersion values at 1550 nm can be made:

$\beta_2 = 57.2$ ps$^2$; $\beta_3 = -3.17$ ps$^3$; and $\beta_4 = 0.14$ ps$^4$

While it is observed that $\beta_2$ and $\beta_3$ are very close to target, $\beta_4$ is ~50% of matching that of the desired grating. As such, a new solution is needed achieve the desired match between the stretcher module and a chosen grating.

SUMMARY

Embodiments of the present invention are generally related to embodiments of the present invention relate to fiber stretcher modules for use in the 1550 nm wavelength range. More specifically, embodiments of the present invention relate to a fiber stretcher module for dispersion management in short pulse laser systems.

In one embodiment of the present invention, a fiber stretcher module for use in the 1550 nm wavelength range comprises a first fiber having a ratio of relative dispersion slope (RDS) over relative dispersion curve (RDC) value of less than about 30 nm and a dispersion value, D, of less than about −10 ps/(nm·km) at about 1550 nm, and a second fiber having a RDC value of about zero, a relative RDS value greater than 0.002 nm$^{-1}$, and a dispersion, D, value of greater than about 10 ps/(nm·km) at about 1550 nm, wherein the lengths of the first and second fibers are adjusted to obtain a best possible dispersion match to a corresponding compressor grating, or other types of compression devices, operating at a wavelength range of Er-doped fiber amplifiers and lasers, which may generally be between about 1520 nm to about 1620 nm (i.e., the 1550 nm range).

In another embodiment of the present invention, a chirped pulse amplification system comprises a pulse generator producing pulses in the 1550 nm wavelength range, and a fiber stretcher module for use in this range, an amplifying element, and a compressor grating or other compression device, where the fiber stretcher module comprises: a first fiber comprising a ratio of relative dispersion slope over relative dispersion curvature (RDS/RDC) value of less than about 30 nm and a dispersion, D, value of less than about −10 ps/(nm·km) at about 1550 nm, and a second fiber comprising a RDC value of about zero, a RDS value greater than 0.002 nm$^{-1}$, and a dispersion value of greater than about 10 ps/(nm·km) at about 1550 nm, wherein the lengths of first and second fibers are adjusted to get the best possible dispersion match to a corresponding compressor grating at about 1550 nm.

In yet another embodiment of the present invention, a method of operating a chirped pulse amplification system in the 1550 nm wavelength range, comprising: providing a pulse generator producing pulses in the 1550 nm wavelength range, providing a fiber stretcher module for use in the 1550 nm wavelength range, a amplifier stage, and a compressor grating, where the fiber stretcher module for use in the 1550 nm wavelength range comprise: a first fiber comprising a ratio of relative dispersion curvature over relative dispersion slope (RDS/RDC) value of less than about 30 nm and a dispersion value of less than about −10 ps/(nm·km) at about 1550 nm, and a second fiber comprising a relative dispersion curvature value of about zero and a relative dispersion slope value greater than 0.002 nm$^{-1}$ and a dispersion value of greater than about 10 ps/(nm·km) at about 1550 nm, wherein the length of first and second fiber is adjusted to get the best possible dispersion match to a corresponding compressor grating or other compression device, at about 1550 nm.

BRIEF DESCRIPTION OF THE DRAWINGS

So the manner in which the above-recited features of the present invention can be understood in detail, a more particular description of embodiments of the present invention, briefly summarized above, may be had by reference to embodiments, which are illustrated in the appended drawings. It is to be noted, however, the appended drawings illustrate only typical embodiments of embodiments encompassed within the scope of the present invention, and, therefore, are not to be considered limiting, for the present invention may admit to other equally effective embodiments, wherein.

Figure 1:
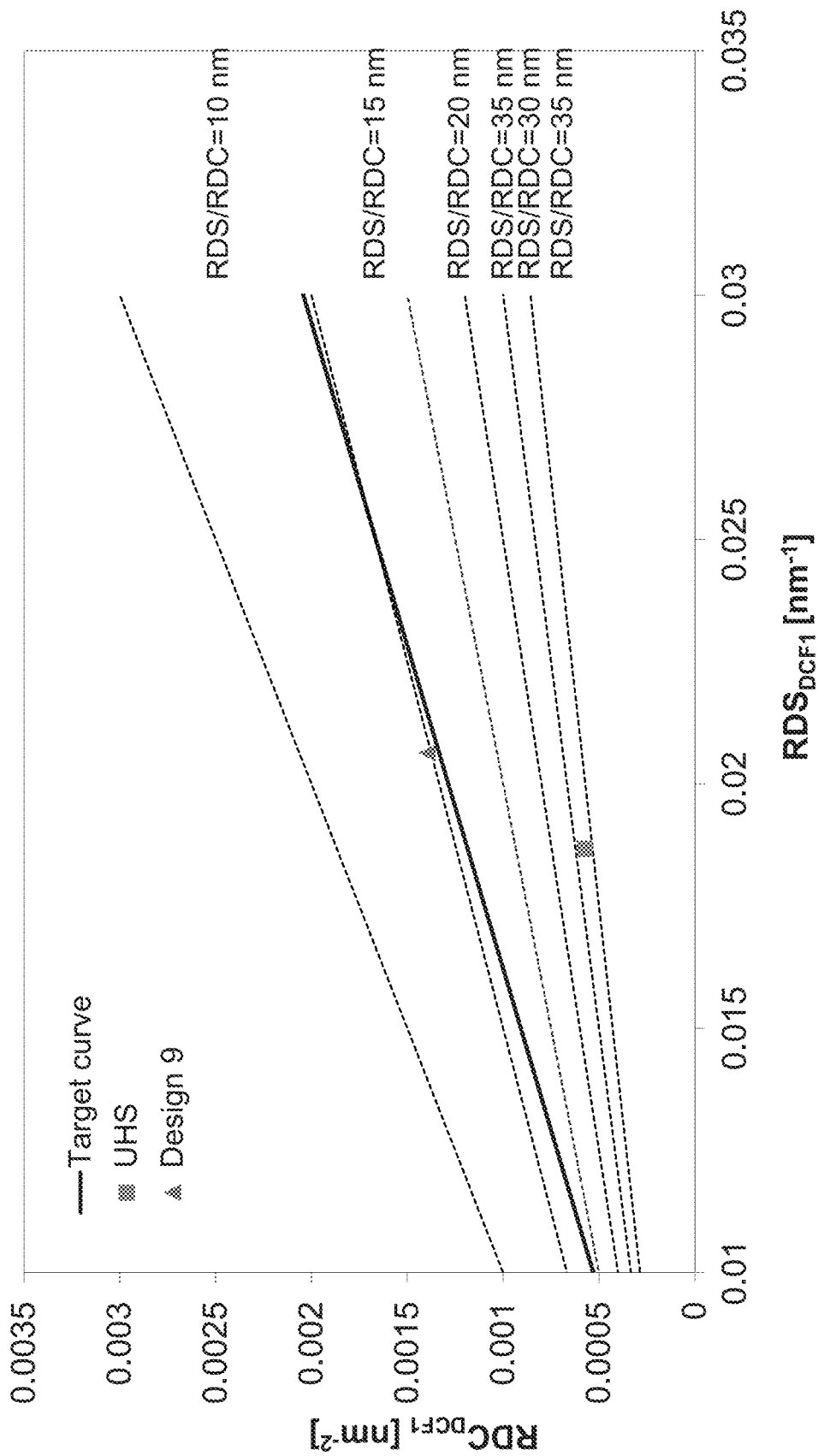
FIG. 1 is a graph of a RDS vs. RDC target curves and results of a stretcher module comprising a known fiber and an exemplary fiber designed in accordance with embodiments of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present invention are generally related to embodiments of the present invention relate to fiber stretcher modules for use in the 1550 nm wavelength range. More specifically, embodiments of the present invention relate to a fiber stretcher module offering an alternative solution for femtosecond fiber-based chirped pulse amplification systems without using bulk optics or chirped fiber Bragg gratings to stretch the pulses.

As used herein, the term "about" or "approximately," or derivatives thereof, when referencing a numerical value should be deemed to include within ten percent of such numerical value in either direction. In addition, when such terms are utilized to described absolutes (e.g., zero), the absolute should be deemed to include within one unit of reasonable measurement in either direction, as would ordinarily be used by those of ordinary skill in the art.

In many embodiments of the present invention, the fiber stretcher module may be suitable for any fiber optic system operating in the 1550 nm range. In one embodiment, the fiber stretcher module may be utilized with any chirped pulse amplification configuration operating in the 1550 nm wavelength range. In such an embodiment, a pulse generator may provide pulses to a system in the 1550 nm wavelength range.

In addition, in accordance with embodiments of the present invention, the fiber stretcher module is capable of single mode operation, despite its multi-moded design. Generally, it obtains such capability through high bend loss of higher order modes.

A fiber stretcher module made in accordance with embodiments of the present invention gives an advantage over current modules using bulk optics or chirped FBG by providing less group delay ripples as well as less amplitude ripples. In addition, the fiber stretcher module is more desirable due to smaller size, better stability, longer lifetime, and lower cost over other fiber solutions.

In one embodiment of the present invention, a fiber stretcher module comprises a first fiber and a second fiber, which, when combined, yields target $\beta 2$, $\beta 3$, and $\beta 4$ values of approximately 57.4 ps$^2$, $-3.17$ psi, and 0.291 ps$^4$, respectively at 1550 nm. To obtain such values, in many embodiments, the fiber stretcher module has an increased RDC compared to currently known modules, e.g., the UHS-DCF module described above.

In accordance with embodiments of the present invention, the $RDC_C$ for a dispersion compensating fiber combined (DCFC) comprising the combination of two fibers, i.e., a first fiber (F1) and a second fiber (F2), can be calculated from:

$$RDC_C = \frac{1}{RDS_{F1} - RDS_{F2}}((RDS_C - RDS_{F2})RDC_{F1} - (RDS_C - RDS_{F1})RDC_{F2})$$

In one embodiment, F2 is a SLA fiber with: $RDS_{F2}=0.003$ nm$^{-1}$, $RDC_{F2}=0$. In such an embodiment, by utilizing target RDS and RDC values of the combined module of $RDS_C=0.0420$ nm$^{-1}$ and $RDC_C=0.00295$ nm$^{-2}$, a desired or target ratio between RDC and RDS for F1 can be calculated. FIG. 1 depicts a graph of a RDC versus RDS target curve and experimental results of a known fiber (UHS) and an exemplary fiber (design 9) designed in accordance with embodiments of the present invention. FIG. 1 also shows lines illustrating fixed RDS/RDC ratios. It is observed that the target curve is close to the 15 nm RDS/RDC line of design 9, while the existing UHS fiber is characterized by a RDS/RDC ratio of 32 nm.

Based upon the above relationship, in the embodiment described, the first fiber (i.e., F1) may be designed to achieve the intended performance characteristics. In another embodiment, the first fiber, F1, may further comprise each of the following limitations: (1) the fiber has a micro-bend loss the same as or better than the current or known fiber designs (2) the fiber has a RDC value greater than 0.0002 nm$^{-2}$ at a wavelength of 1550 nm; and/or (3) the fiber has a dispersion at 1550 nm in the range of $-40$ to $-70$ ps/(nm·km). Such a combination of characteristics yields a fiber design suitable for embodiments of the present invention.

Based on the requirements above, simulation experiments were conducted using different fiber designs, and the results are presented herein.

Figure 2:
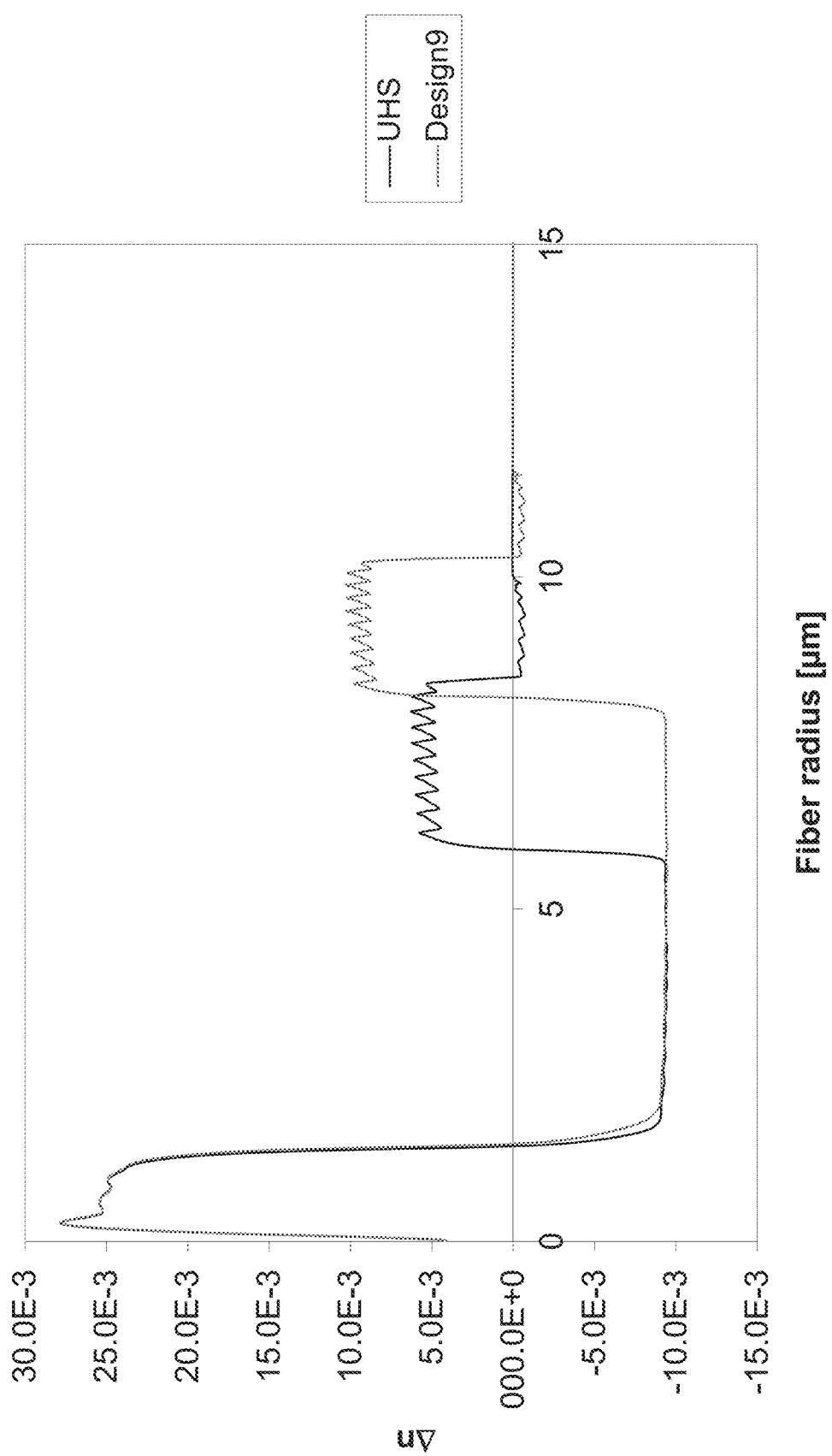
FIG. 2 is a graph showing refractive index profiles of a stretcher module comprising a known fiber and an exemplary fiber designed in accordance with embodiments of the present invention.

FIG. 2 depicts a graph showing a desired refractive index profile of a fiber in accordance with embodiments of the present invention as compared to a known UHS fiber. Both fibers are characterized by having three principal features. A central core with a positive Δn relative to the outer cladding, surrounded by a trench with a negative Δn relative to the outer cladding, further surrounded by a ring with positive Δn relative to the outer cladding, followed by the outer cladding. In a physical realization of the fiber shown in FIG. 2, the core typically comprises silica doped with germanium, the trench comprises silica doped with fluorine and, optionally, a small amount of germanium, and the ring comprises silica doped with germanium and, optionally, a small amount of fluorine. The outer cladding may be made of pure silica. Between the ring and the outer cladding, there may be an inner cladding layer (with around the same Δn as the pure silica cladding) consisting of silica doped with fluorine and further doped with phosphor and/or germanium. It is noted that the refractive index profile of this fiber as compared to a known UHS fiber is distinguished primarily by having a broader trench and a ring with a higher Δn relative to the outer cladding.

Figure 3:
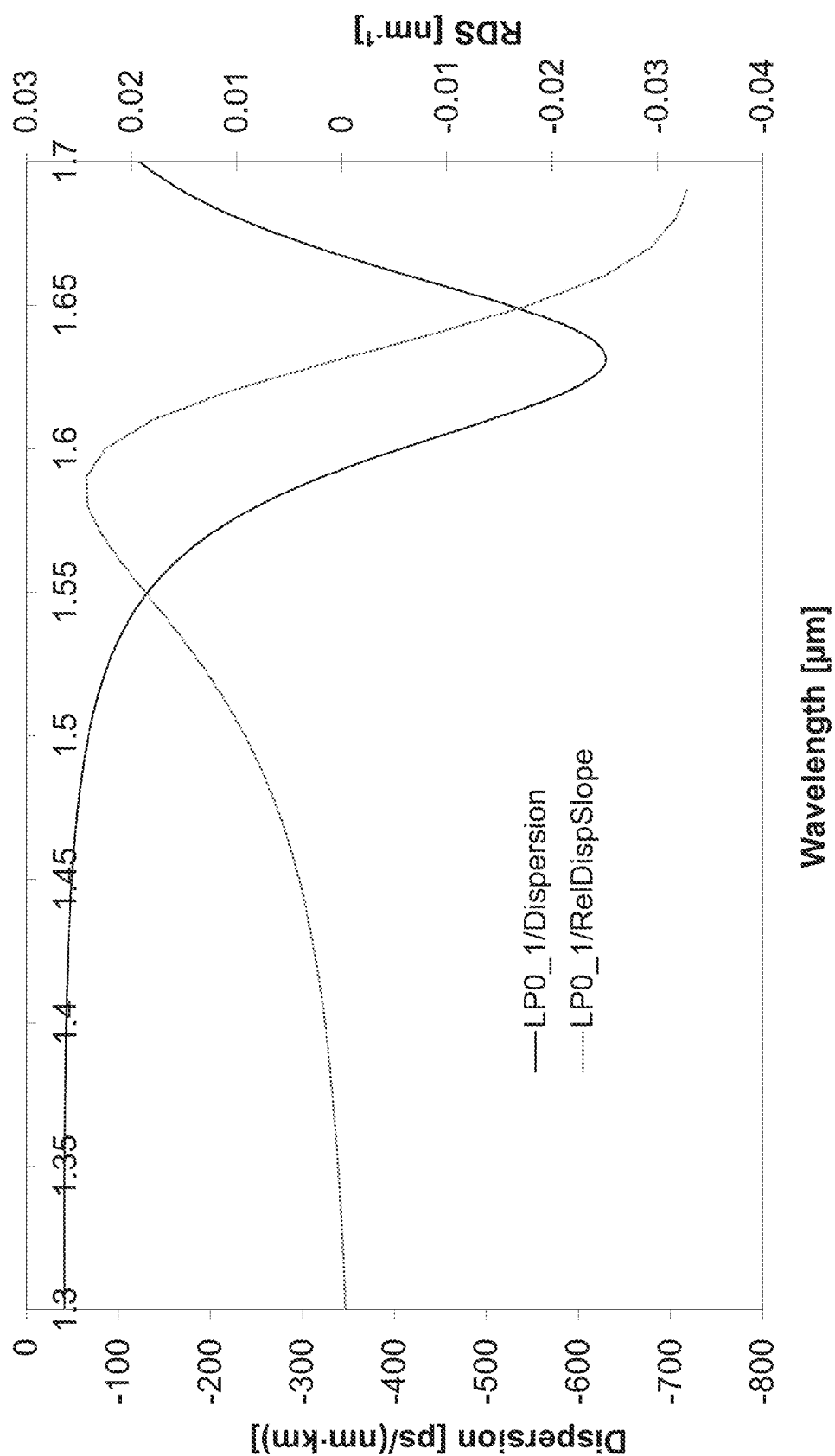
FIG. 3 is a graph showing modeled properties for dispersion and RDS values for a known fiber in accordance with embodiments of the present invention.
Figure 4:
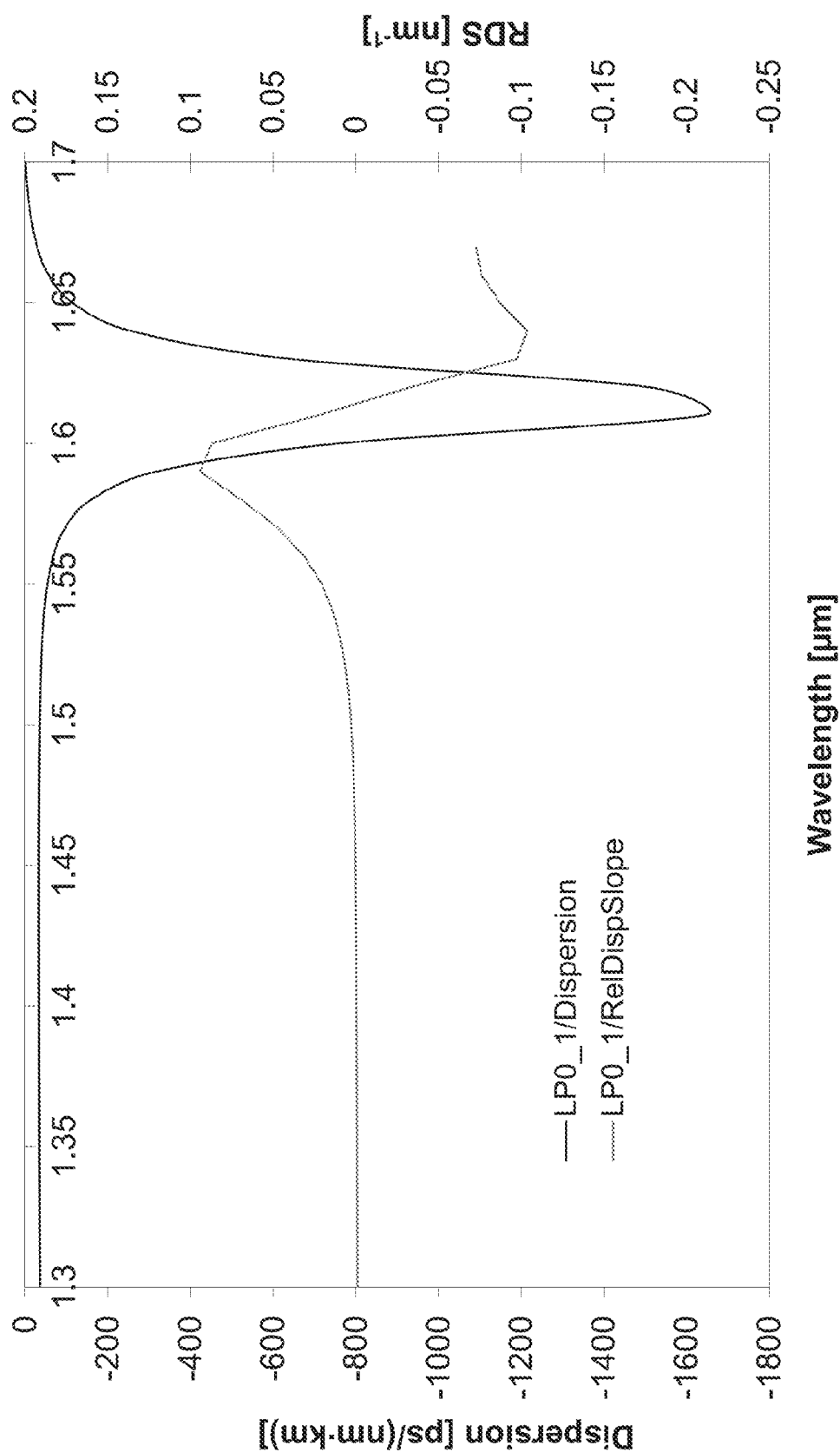
FIG. 4 is a graph showing modeled properties for dispersion and RDS values for one exemplary fiber design in accordance with embodiments of the present invention.

FIGS. 3 and 4 depict graphs comparing the modeled properties for dispersion and RDS values for a known UHS fiber and for the design 9 fiber in accordance with embodiments of the present invention, respectively.

Figure 5:
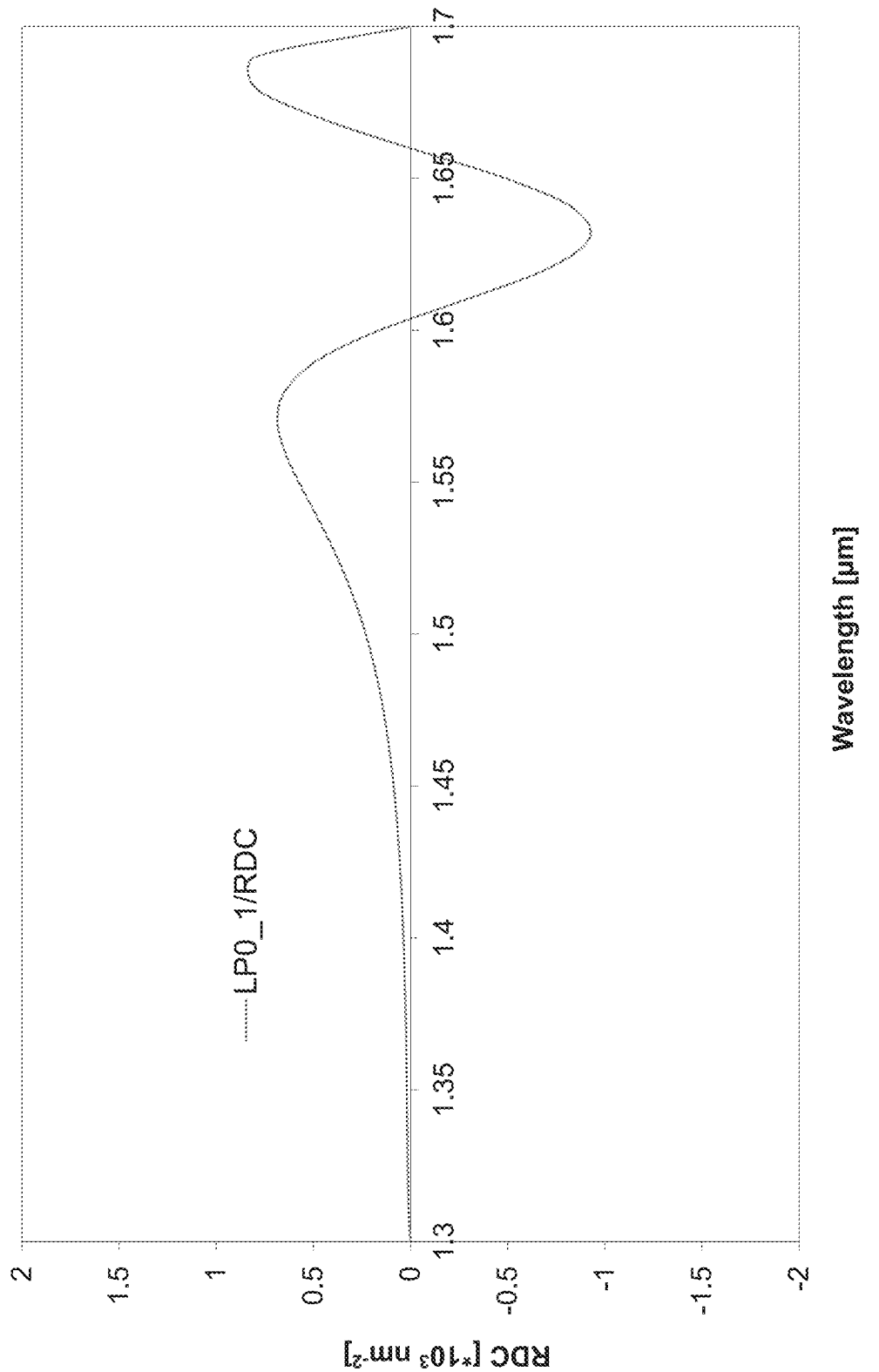
FIG. 5 is a graph showing modeled RDC properties for a known fiber in accordance with embodiments of the present invention.
Figure 6:
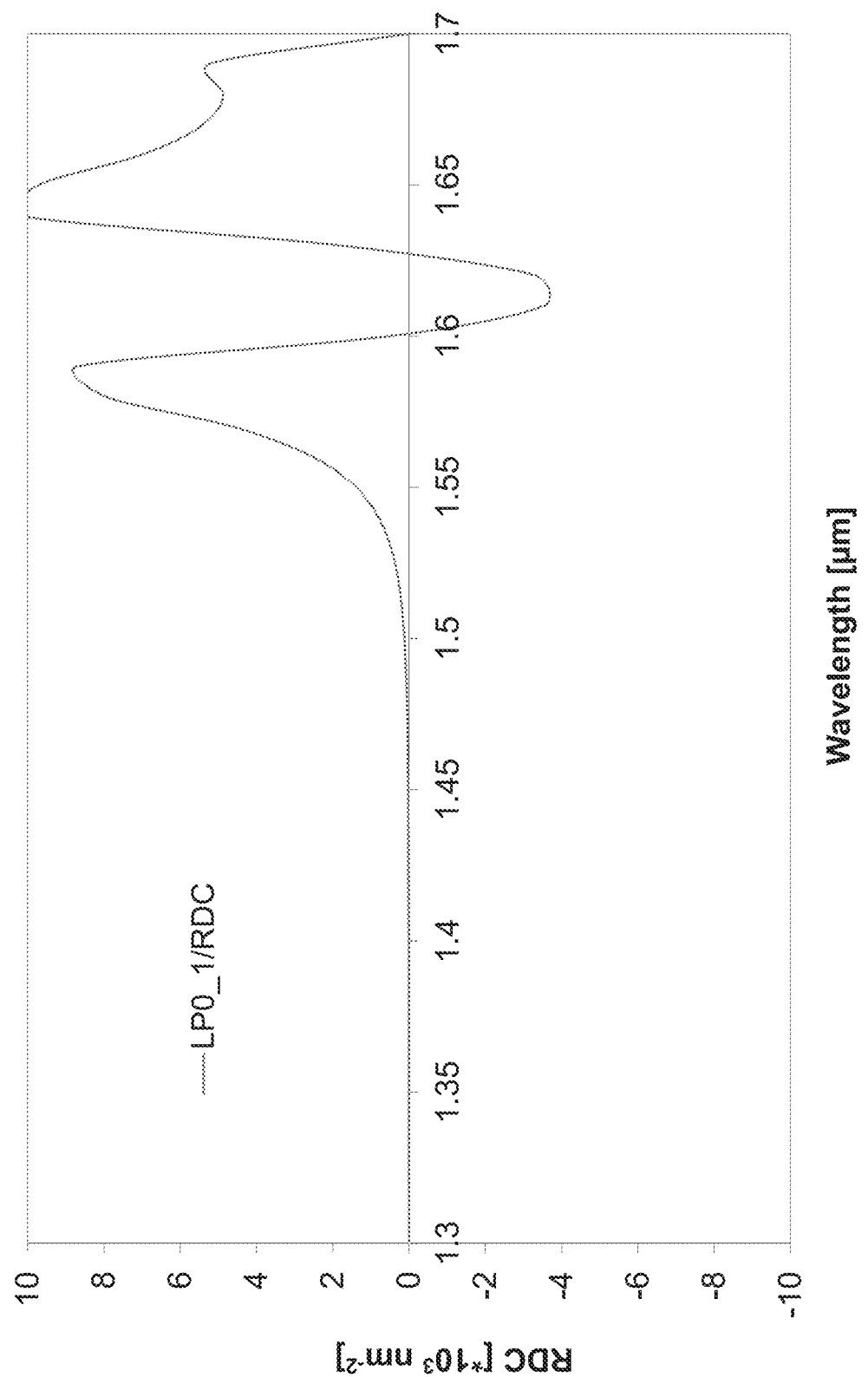
FIG. 6 is a graph showing modeled RDC properties for an exemplary fiber designed in accordance with embodiments of the present invention.

FIGS. 5 and 6 depicts graphs showing modeled properties for RDC values for a known UHS fiber, and for target design 9 fiber in accordance with embodiments of the present invention, respectively. As shown, the design 9 provides a significantly higher RDC value around the 1550 nm operating range. When comparing the dispersion, RDS, and RDC of the design 9 fiber to those of the UHS design, it is noted that the increased RDS/RDC ratio is obtained by decreasing the wavelength range of the negative dispersion peak, which simultaneously has become much deeper. This is a consequence of the broader trench and the higher Δn of the ring of design 9 compared to that of the UHS design.

Figure 7:
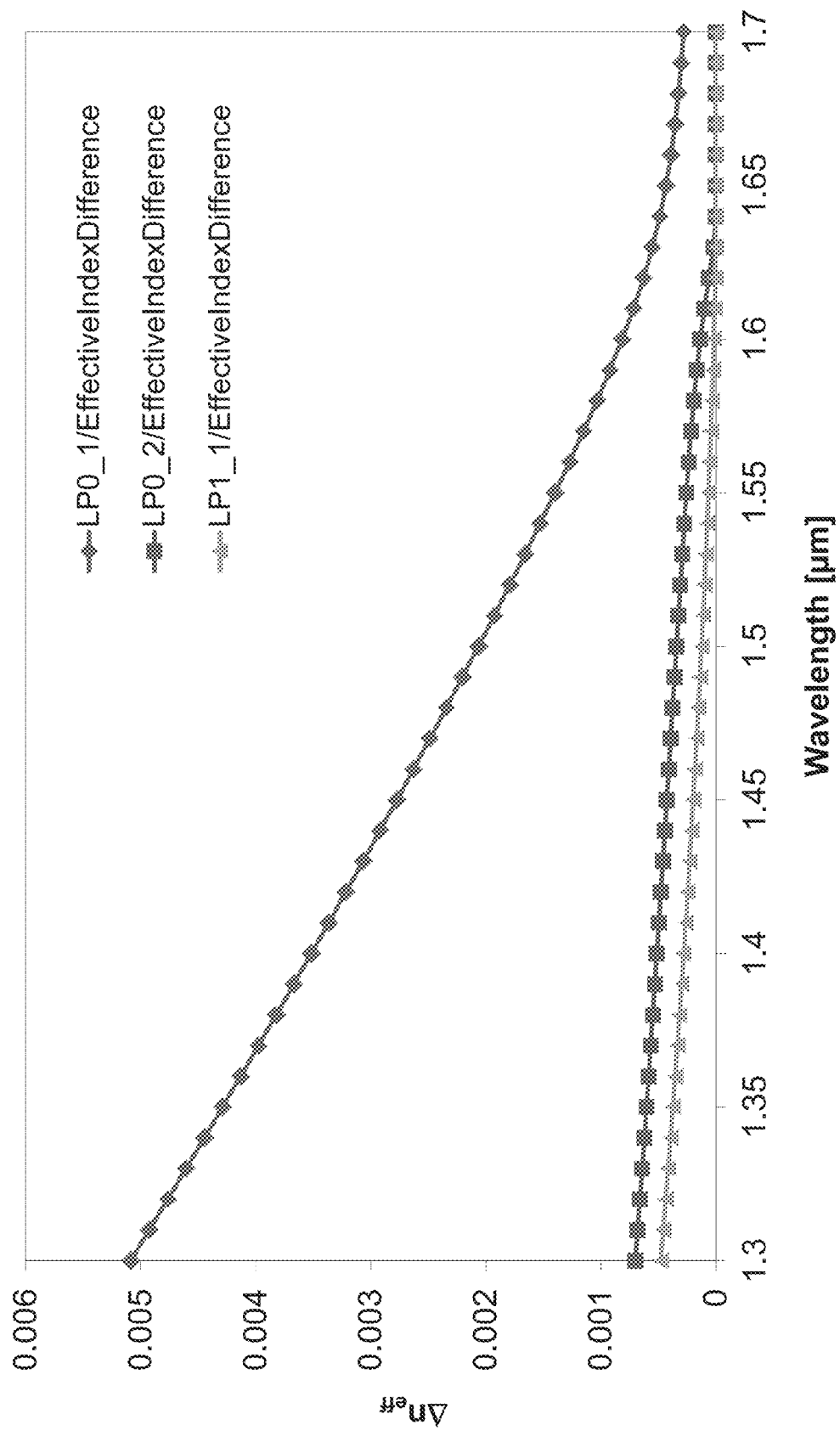
FIG. 7 is a graph showing modeled effective index differences relative to the cladding for a known fiber in accordance with embodiments of the present invention.
Figure 8:
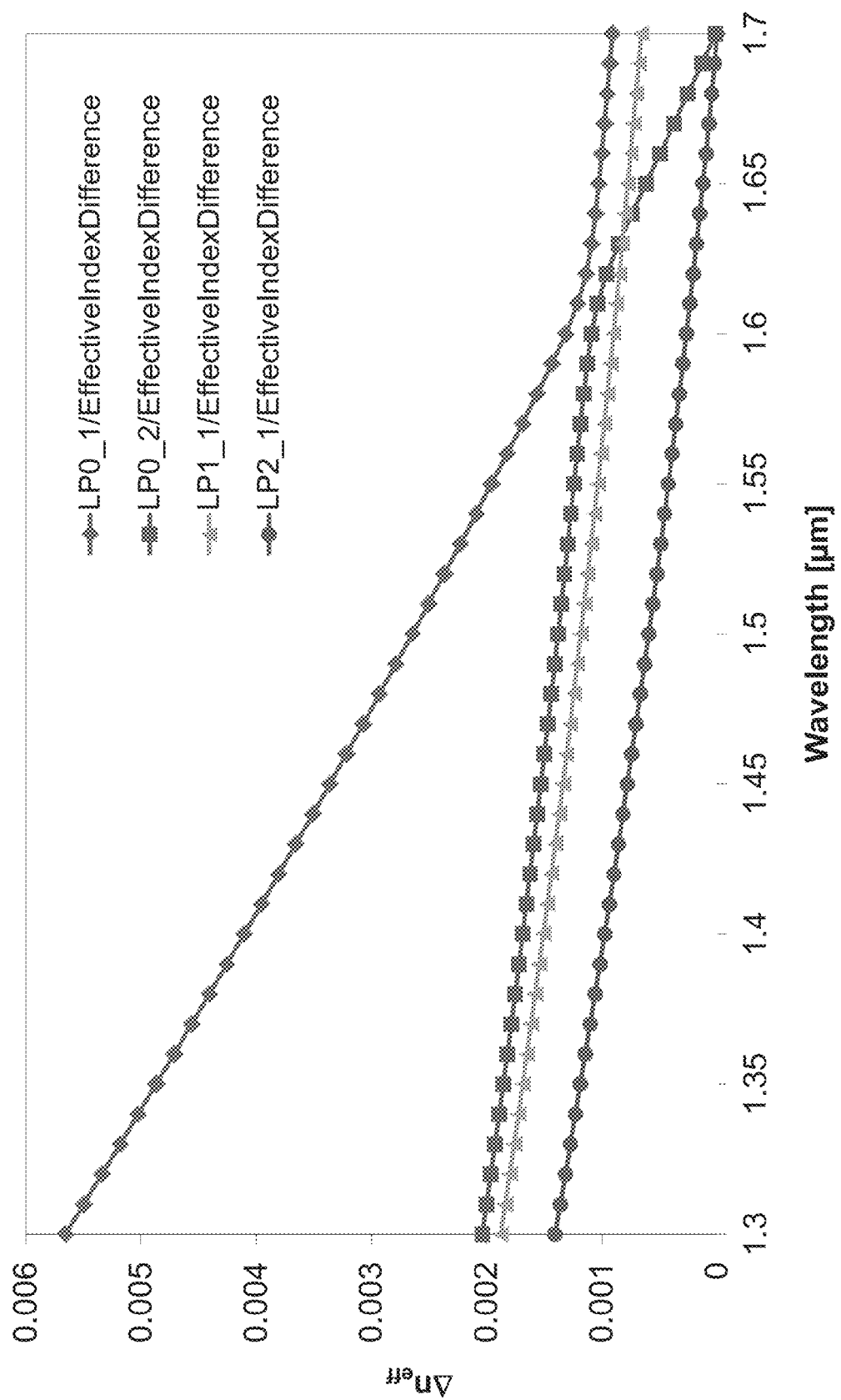
FIG. 8 is a graph showing modeled effective indexes differences relative to the cladding for an exemplary fiber designed in accordance with embodiments of the present invention.
Figure 9:
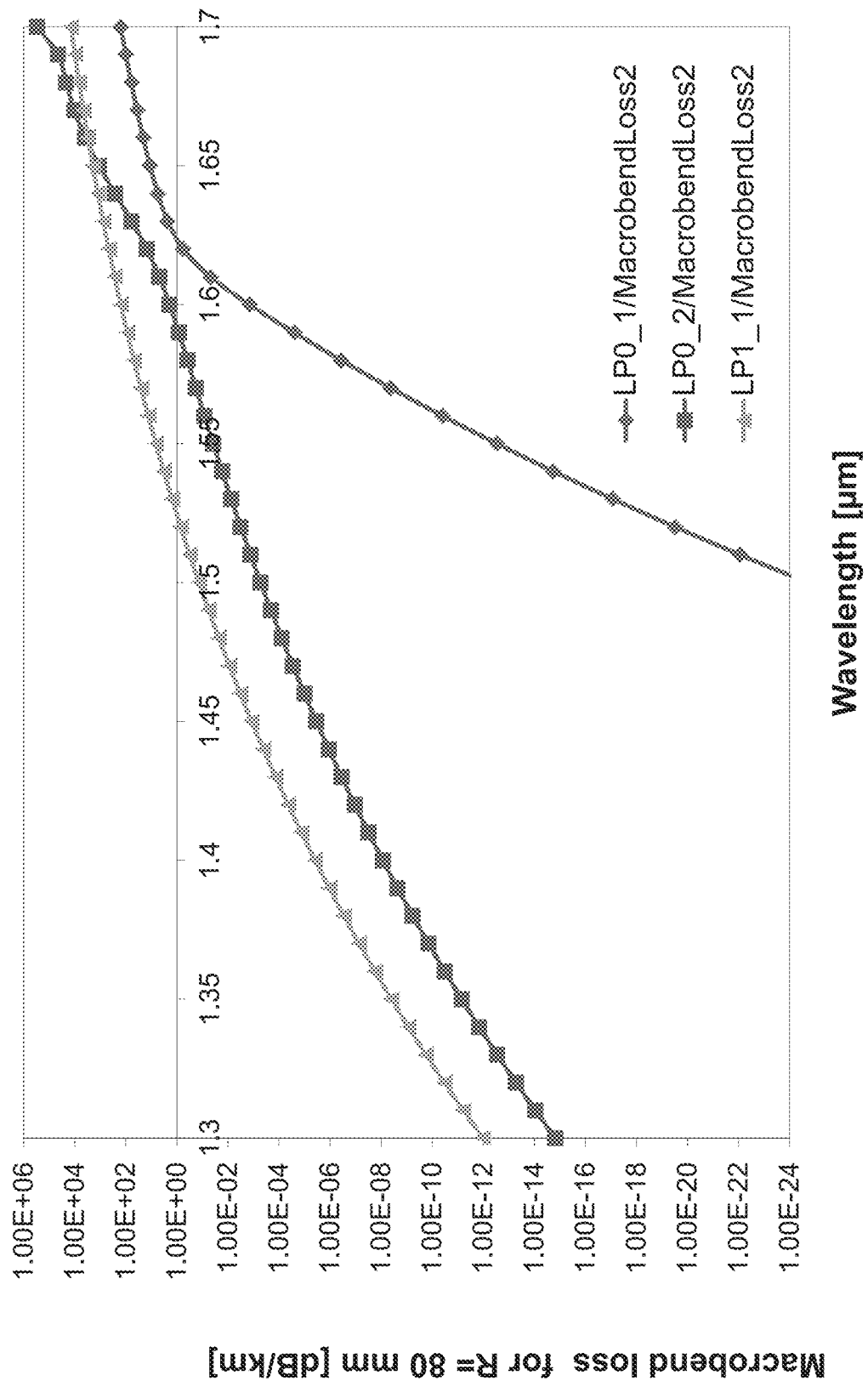
FIG. 9 is a graph showing modeled bend loss of an exemplary fiber designed in accordance with embodiments of the present invention.

FIGS. 7 and 8 depict modeled effective indices for the fundamental mode $LP_{01}$ as well as for the first three higher order modes $LP_{02}$, $LP_{11}$ and $LP_{21}$ for a known UHS fiber, and for the design 9 fiber, respectively. It is observed in FIG. 8, at 1550 nm in addition to $LP_{01}$, the $LP_{02}$, $LP_{11}$ and $LP_{21}$ modes seem to have a substantial effective index, which indicates the design 9 fiber is not single moded. However, as shown in FIG. 9, which depicts a graph showing bend loss for the design 9 fiber, the higher order modes of this fiber have substantially higher bend loss, thereby assuring single mode operation.

Figure 10:
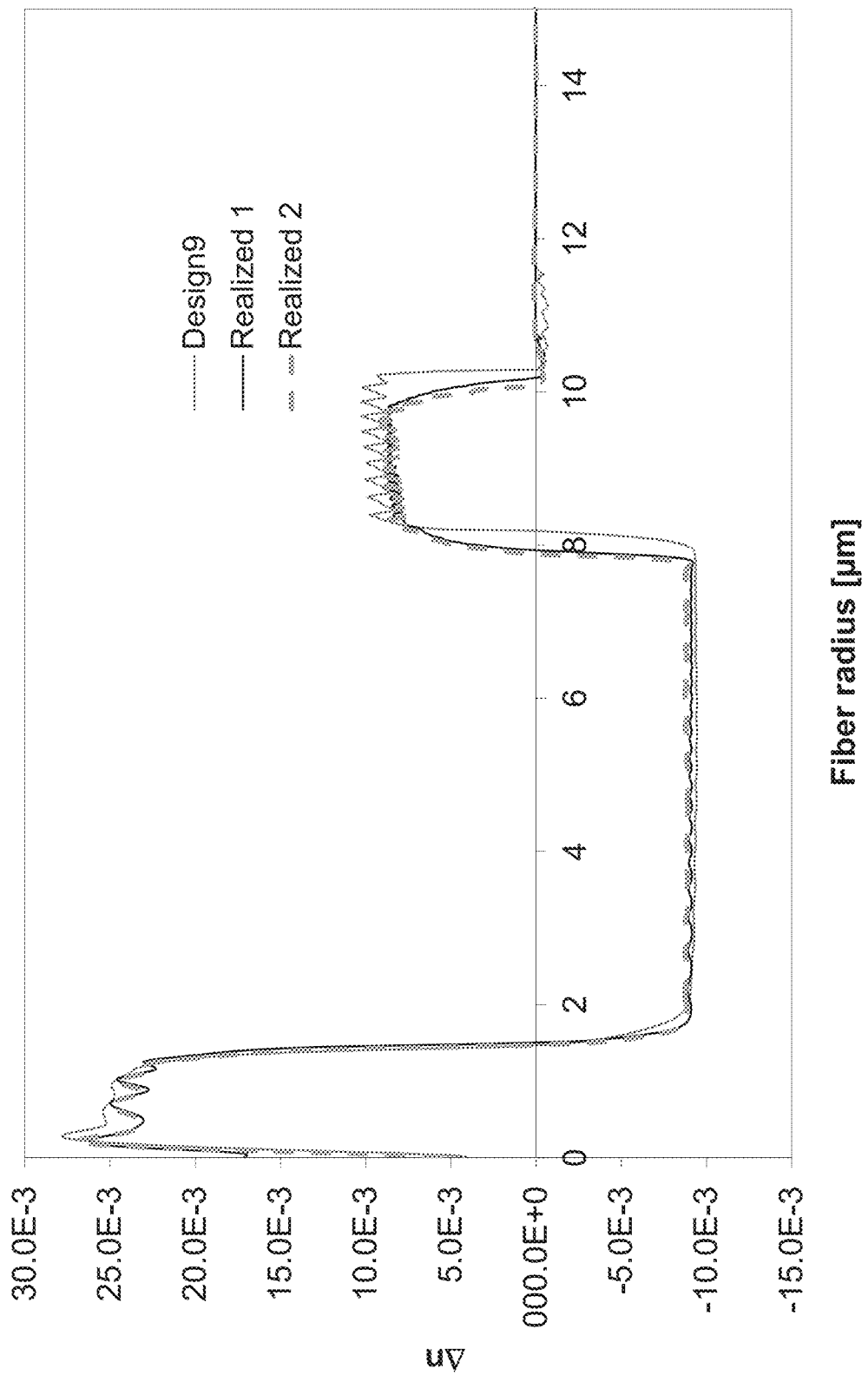
FIG. 10 is a graph showing an index profile of an exemplary fiber designed in accordance with embodiments of the present invention and examples of two realizations, i.e., two different preforms with different index profiles.

Two different preforms were manufactured and drawn into fibers. FIG. 10 depicts a graph showing examples of index profiles of two physical realizations in accordance with embodiments of the present invention as compared to the targeted design 9 fiber index profile. The results of such measured characteristics of the fibers drawn from the two preforms are shown below in Table 1 and Table 2 respectively.

TABLE 1

| Preform id | Spool id | length m | attenuation @1310 nm dB/km | attenuation @1410 nm dB/km | attenuation @1550 nm dB/km | attenuation @1625 nm dB/km | dispersion @1550 nm ps/(nm · km) | RDS @1550 nm $nm^{-1}$ | RDC @1550 nm $nm^{-2}$ | PMD ps · $km^{-0.5}$ |
|---|---|---|---|---|---|---|---|---|---|---|
| 90519371 | 21000000 | 10019 | 0.975 | 0.888 | 0.591 | 1.934 | −41.04 | 0.009988 | 0.00045424 | |
| 90519371 | 22000000 | 10019 | 0.926 | 0.852 | 0.560 | 1.137 | −34.6 | 0.006534 | 0.00029807 | |
| 90519371 | 23000000 | 10019 | 0.928 | 0.859 | 0.564 | 0.921 | −33.88 | 0.005485 | 0.00013972 | |
| 90519371 | 24000000 | 10014 | 0.926 | 0.858 | 0.563 | 1.000 | −34.5 | 0.005833 | 0.00027502 | |
| 90519371 | 25000000 | 10014 | 0.940 | 0.864 | 0.568 | 1.463 | −34.38 | 0.005618 | 0.00013382 | |
| 90519371 | 26000000 | 10014 | 0.936 | 0.860 | 0.564 | 0.877 | −33.95 | 0.004932 | 0.00017107 | |
| 90519371 | 27000000 | 10014 | 0.930 | 0.860 | 0.563 | 0.801 | −33.75 | 0.005324 | 0.00012471 | 0.032 |
| 90519371 | 28000000 | 10024 | 0.937 | 0.866 | 0.564 | 0.719 | −33.57 | 0.004786 | 0.00022643 | |
| 90519371 | 29100000 | 10019 | 0.928 | 0.863 | 0.560 | 1.244 | −36.22 | 0.006683 | 0.00029546 | |
| 90519371 | 29200000 | 10009 | 0.933 | 0.868 | 0.563 | 1.022 | −36.2 | 0.006712 | 0.00021409 | |
| 90519371 | 29400000 | 10019 | 0.933 | 0.869 | 0.563 | 1.396 | −38.05 | 0.007591 | 0.00034645 | |
| 90519371 | 29500000 | 10014 | 0.965 | 0.931 | 0.557 | 1.688 | −40.71 | 0.009453 | 0.00041642 | 0.032 |
| 90519371 | 29600000 | 10014 | 0.932 | 0.867 | 0.560 | 1.639 | −39.72 | 0.008826 | 0.00036873 | |
| 90519371 | 29700000 | 10014 | 0.935 | 0.860 | 0.564 | 1.521 | −40.03 | 0.00883 | 0.0003046 | |
| 90519371 | 29800000 | 10009 | 0.959 | 0.916 | 0.560 | 1.601 | −40.94 | 0.00932 | 0.00036143 | 0.048 |
| 90519371 | 29910000 | 10019 | 0.925 | 0.859 | 0.561 | 1.618 | −41.12 | 0.009677 | 0.00039108 | |
| 90519371 | 29920000 | 10009 | 0.922 | 0.862 | 0.563 | 1.714 | | | | |
| 90519371 | 29930000 | 10009 | 0.919 | 0.853 | 0.557 | 1.635 | −43.3 | 0.011115 | 0.00050825 | |
| 90519371 | 29940000 | 10019 | 0.924 | 0.850 | 0.554 | 1.616 | −42.81 | 0.010879 | 0.00053815 | 0.056 |
| 90519371 | 29950000 | 4861 | 0.953 | 0.909 | 0.552 | 2.442 | −43.21 | 0.011847 | 0.00055459 | 0.085 |
| 90519371 | 29960000 | 9288 | 0.984 | 0.934 | 0.575 | 2.135 | −45.9 | 0.013275 | 0.00060773 | 0.056 |

TABLE 2

| Preform id | Spool id | length m | attenuation @1550 nm dB/km | dispersion @1550 nm ps/(nm · km) | RDS @1550 nm $nm^{-1}$ | RDC @1550 nm $nm^{-2}$ | PMD ps · $km^{-0.5}$ |
|---|---|---|---|---|---|---|---|
| 110224371 | 72000000 | 10019 | 0.5625 | −46.14 | 0.013455 | 0.00072957 | 0.027 |
| 110224371 | 73000000 | 10009 | 0.5595 | −43.25 | 0.011707 | 0.00060404 | 0.017 |
| 110224371 | 74000000 | 10009 | 0.5595 | −42.95 | 0.010896 | 0.00054881 | 0.02 |
| 110224371 | 75000000 | 10009 | 0.556 | −41.7 | 0.00961 | 0.00045269 | 0.038 |
| 110224371 | 76000000 | 10014 | 0.5525 | −41.32 | 0.009198 | 0.0003235 | 0.135 |

TABLE 2-continued

| Preform id | Spool id | length m | attenuation @1550 nm dB/km | dispersion @1550 nm ps/(nm · km) | RDS @1550 nm nm$^{-1}$ | RDC @1550 nm nm$^{-2}$ | PMD ps · km$^{-0.5}$ |
|---|---|---|---|---|---|---|---|
| 110224371 | 77000000 | 10014 | 0.557 | −43.71 | 0.011118 | 0.00053023 | 0.172 |
| 110224371 | 78000000 | 10014 | 0.555 | −42.33 | 0.010222 | 0.0005101 | 0.142 |
| 110224371 | 79100000 | 10014 | 0.558 | −45.9 | 0.012567 | 0.00064317 | 0.15 |
| 110224371 | 79200000 | 10014 | 0.5525 | −44.87 | 0.011487 | 0.00055535 | 0.273 |
| 110224371 | 79300000 | 10009 | 0.5535 | −49.73 | 0.014962 | 0.00078894 | 0.094 |
| 110224371 | 79400000 | 10014 | 0.5565 | −51.33 | 0.014464 | 0.00062795 | 0.144 |
| 110224371 | 79500000 | 10009 | 0.557 | −61.27 | 0.020728 | 0.00111174 | 0.23 |
| 110224371 | 79600000 | 10019 | 0.5595 | −59.74 | 0.019709 | 0.00099303 | 0.027 |
| 110224371 | 79700000 | 10009 | 0.5645 | −60.18 | 0.019488 | 0.00108797 | 0.049 |
| 110224371 | 79910000 | 10004 | 0.5515 | −59.52 | 0.020206 | 0.00112428 | 0.135 |
| 110224371 | 79920000 | 5446 | 0.5475 | −59.61 | 0.021246 | 0.0010569 | 0.065 |
| 110224371 | 79930000 | 10009 | 0.556 | −60.4 | 0.020153 | 0.0010602 | 0.065 |
| 110224371 | 79940000 | 6247 | 0.57 | −69.42 | 0.026332 | 0.0017611 | 0.083 |
| 110224371 | 79950000 | 5143 | 0.5715 | −83.26 | 0.027574 | 0.00196319 | 0.089 |

Figure 11:
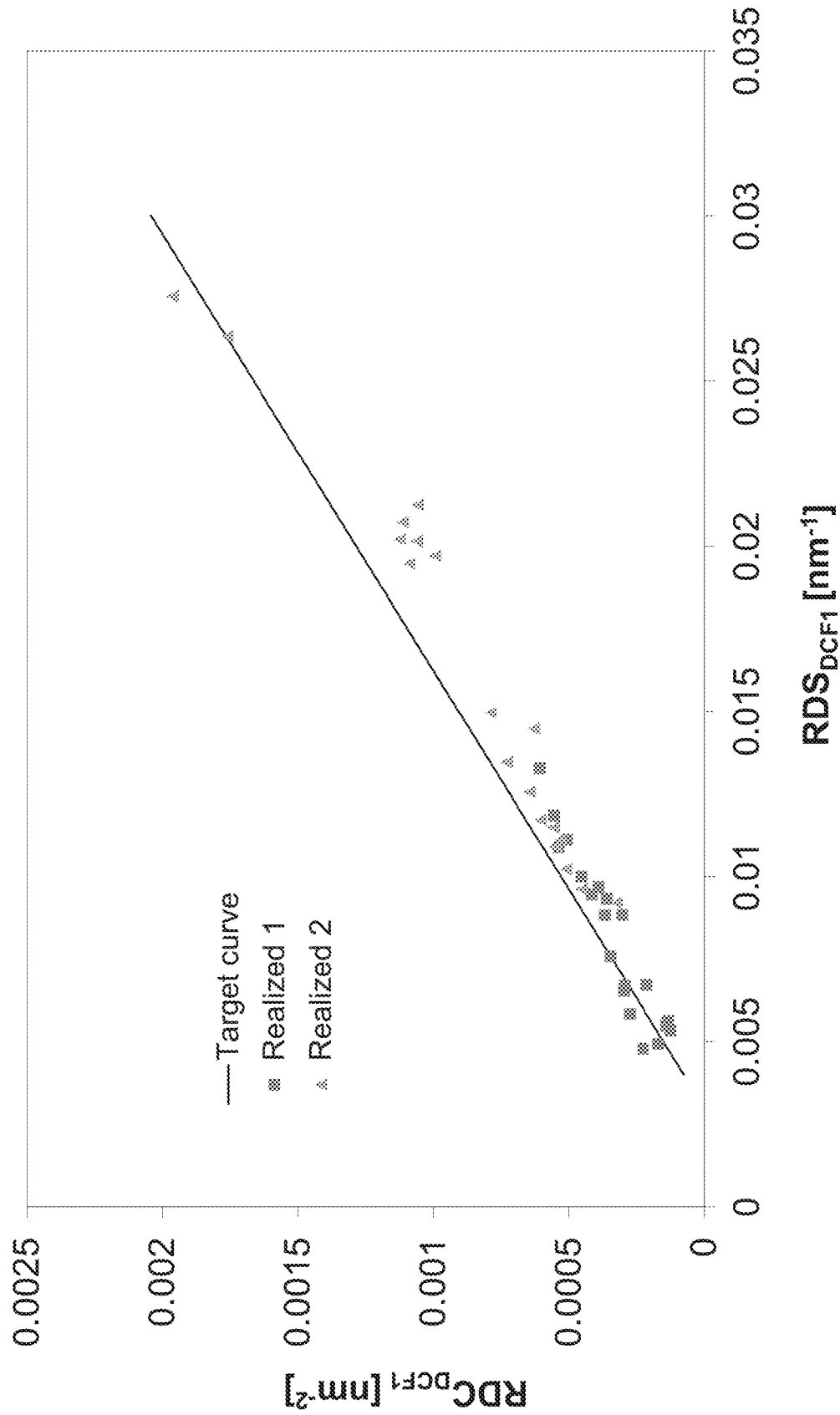
FIG. 11 is a graph showing measured RDC versus RDS values for two exemplary fibers designed in accordance with embodiments of the present invention as compared to a target.

FIG. 11 depicts a graph showing a relationship between measured RDC and RDS values for the experimental tests discussed above in Table 1 and 2. As shown, despite the large spread in experimental values, the designed fibers, Realized 1 and Realized 2 produce RDS/RDC ratio values falling close to the target line.

Figure 12:
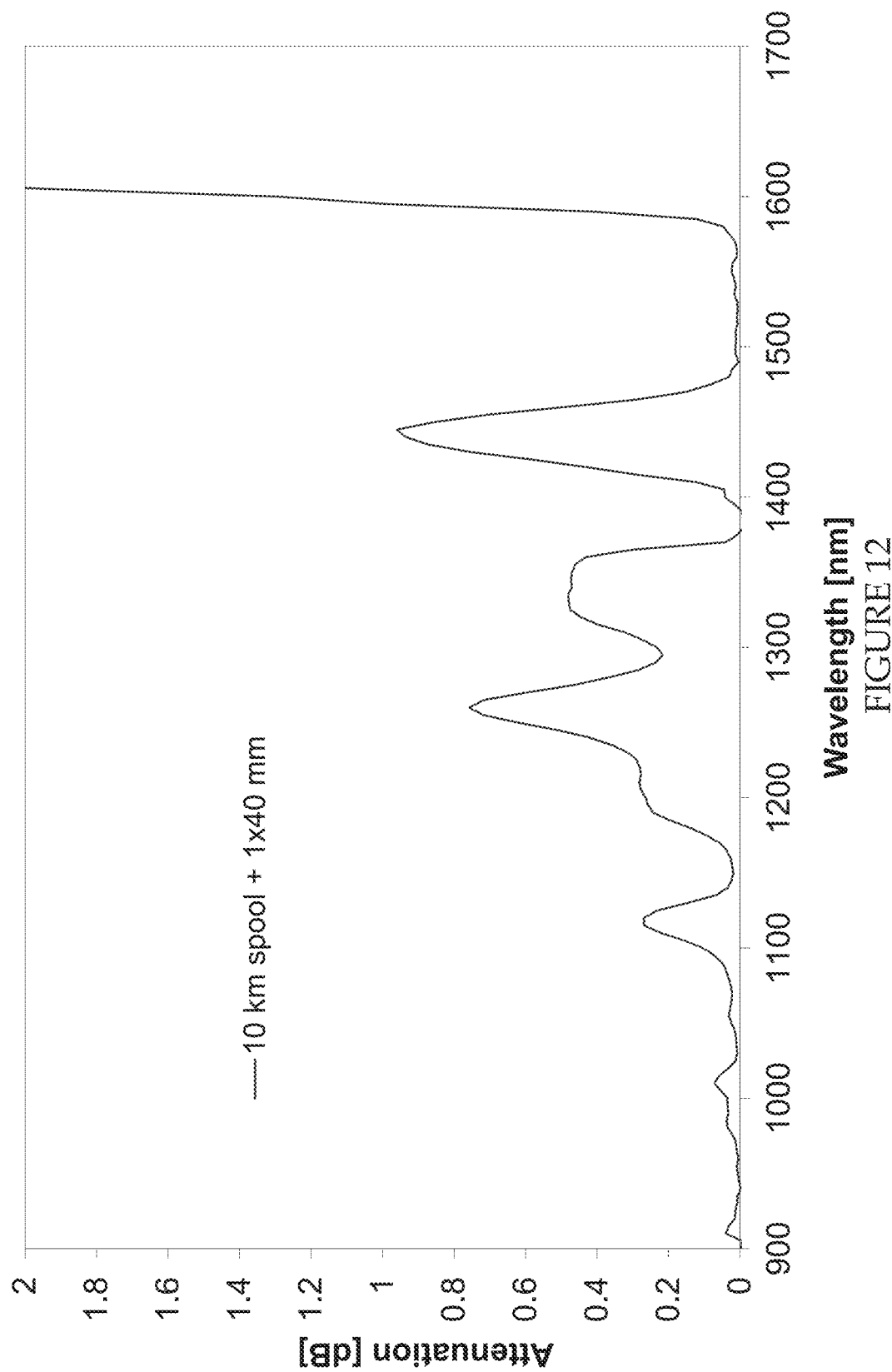
FIG. 12 is a graph showing the results of a special cut off measurement analysis performed on an exemplary fiber designed in accordance with embodiments of the present invention.

In addition to the experimental tests described above, to examine whether single mode operation of the fiber in long length is obtained, a special cut off measurement was performed. The experiment involved measuring the attenuation of the fiber due to a Ø40 mm mandrel after propagation through 10 km of fiber, spooled on a spool with a bobbin radius of 90 mm. FIG. 12 depicts a graph showing the results of the special cut off measurement analysis. As shown in the Figure, with the applied winding conditions, the fiber is single mode over about 1480 nm after 10 km.

In view of all the experimentation conducted, as described herein above, an exemplary fiber in accordance with embodiments of the present invention may be combined with an SLA fiber to create a stretcher fiber module in accordance with embodiments of the present invention. In accordance with another exemplary embodiment, a stretcher fiber module was made using a fiber as described hereinabove, more specifically, a fiber as described in Table 1 was combined with a known SLA fiber to create a stretcher fiber module having the properties displayed below in Table 3.

TABLE 3

| Fiber ID: | | 0904 45070001 |
|---|---|---|
| Dispersion @ 1550 nm | ps/nm | −45.2 |
| Beta 2 @ 1550 nm | ps$^2$ | 57.7 |
| Beta 3 @ 1550 nm | ps$^3$ | −3.23 |
| Beta 4 @ 1550 nm | ps$^4$ | 0.25 |
| Max Insersion loss 1540 to 1560 nm | dB | 6.0 |
| PMD | ps | 0.17 |
| MPI 1540 to 1560 nm | dB | <−41 |
| Length total | m | 14621 |
| Length DCF | m | 5459 |
| Length SLA | m | 9162 |
| Effective area @ 1550 nm DCF | µm$^2$ | 13 |
| Effective area @ 1550 nm SLA | µm$^2$ | 112 |
| Dispersion coefficient @ 1550 nm DCF | ps/(nm · km) | −42.0 |
| Dispersion coefficient @ 1550 nm SLA | ps/(nm · km) | 20.2 |

Analyzing the data of Table 3, it is observed that when compared to the known UHS/SLA module, a much better match for the fourth order dispersion parameter, β4, is obtained. Although the experimental testing resulted in an insertion loss being a little high (i.e., 6.0 dB), such results are likely due to a long fiber length, and/or as a result of the lower RDS of the realized fiber as shown in Table 1 as compared to the target design (e.g., compare FIG. 11 with FIG. 1). In addition, it should be noted the multipath interference (MPI) measurement is quite low (i.e., below the detection limit of the setup), which generally confirms the module operates in a single mode.

It should be appreciated, through embodiments of the present invention, the design techniques utilized to design the fiber stretcher module, and in particular, the first fiber therein, may be utilized by those of ordinary skill in the art to develop equally effective fiber assemblies for related applications. As such, embodiments of the present invention should be deemed inclusive of such modifications, as understood by one of ordinary skill in the art.

While the foregoing is directed to embodiments of the present invention, other and further embodiments of the invention may be devised without departing from the basic scope thereof. It is also understood that various embodiments described herein may be utilized in combination with any other embodiment described, without departing from the scope contained herein. In addition, embodiments of the present invention may be further scalable, as particular applications may require.

What is claimed is:

1. An optical fiber stretcher module for use in the 1550 nm wavelength range comprising:
    a first fiber having a relative dispersion slope, RDS, and a relative dispersion curvature, RDC, wherein a ratio of the slope to the curvature is between about 30 nm, and about 0 nm, having a dispersion value of less than about −10 ps/(nm·km) at about 1550 nm and the RDS is between about 0.004 nm$^{-1}$ to about 0.03 nm$^{-1}$ and the RDC is between about 0.0001 nm$^{-2}$ to about 0.002 nm$^{-2}$.

2. The optical fiber stretcher module of claim 1, wherein the dispersion of the fiber in the 1550 nm range is between about −20 ps/(nm·km) to about −100 ps/(nm~km).

3. The optical fiber stretcher module of claim 1, further comprising:
    a second fiber having a RDC of about zero, a RDS value greater than 0.002 nm$^{-1}$ and a dispersion value of greater than about 10 ps/(nm·km), at about 1550 nm.

4. The optical fiber stretcher module of claim 3, wherein the second fiber comprises a super large effective area fiber, having a dispersion value of about 20 ps/(nm·km) and a relative dispersion slope of about 0.003 nm$^{-1}$, at about 1550 nm.

5. The optical fiber stretcher module of claim 3, wherein the optical fiber stretcher module in the 1550 nm range has an RDS between about 0.005 nm$^{-1}$ and about 0.06 nm$^{-1}$.

6. The fiber stretcher module of claim 5, wherein the optical fiber stretcher module in the 1550 nm range comprises a RDS of about 0.042 nm$^{-1}$, and a RDC of about 0.00295 nm$^{-1}$.

* * * * *